(12) United States Patent
Zhou

(10) Patent No.: US 10,902,098 B2
(45) Date of Patent: Jan. 26, 2021

(54) LOGIC ENCRYPTION FOR INTEGRATED CIRCUIT PROTECTION

(71) Applicant: Northwestern University, Evanston, IL (US)

(72) Inventor: Hai Zhou, Glencoe, IL (US)

(73) Assignee: Northwestern University, Evanston, IL (US)

( * ) Notice: Subject to any disclaimer, the term of this patent is extended or adjusted under 35 U.S.C. 154(b) by 194 days.

(21) Appl. No.: 16/032,305

(22) Filed: Jul. 11, 2018

(65) Prior Publication Data

US 2019/0018936 A1 Jan. 17, 2019

Related U.S. Application Data

(60) Provisional application No. 62/531,021, filed on Jul. 11, 2017.

(51) Int. Cl.
| | | |
|---|---|---|
| *G06F 21/14* | (2013.01) | |
| *H04L 9/32* | (2006.01) | |
| *G09C 1/00* | (2006.01) | |
| *H04L 9/00* | (2006.01) | |
| *G06F 30/327* | (2020.01) | |

(52) U.S. Cl.
CPC ............ G06F 21/14 (2013.01); G06F 30/327 (2020.01); G09C 1/00 (2013.01); H04L 9/002 (2013.01); H04L 9/3239 (2013.01); H04L 9/3242 (2013.01); *G06F 2212/1052* (2013.01); *G06F 2221/2107* (2013.01); *H04L 2209/12* (2013.01); *H04L 2209/16* (2013.01)

(58) Field of Classification Search
CPC ................... G06F 21/14; G06F 30/327; G06F 2212/1052; G06F 2212/2107; G09C 1/00; H04L 9/002; H04L 9/3239; H04L 9/3242; H04L 2209/12; H04L 2209/162
USPC .......................................................... 713/193
See application file for complete search history.

(56) References Cited

U.S. PATENT DOCUMENTS

| | | | |
|---|---|---|---|
| 9,906,360 B2 * | 2/2018 | Johnson | ................ H04L 9/0618 |
| 2007/0033419 A1 * | 2/2007 | Kocher | ................... G06F 9/445 |
| | | | 713/193 |
| 2018/0232479 A1 * | 8/2018 | Sinanoglu | ............... G06F 30/30 |

OTHER PUBLICATIONS

Pal et al. "FPGA Implementation of Stream Cipher Using Toeplitz Hash Function" 2014 IEEE, 978-1-4799-3080—Jul. 14, 2014 International Conference on Advances in Computing,Communications and Informatics (ICACCI) pp. 1834-1838 (Year: 2014).*
Apon, Daniel, et al., Implementing Cryptographic Program Obfuscation, International Cryptology Conference, Oct. 1, 2014, pp. 1-22.
Barak, Boaz, et al., On the (Im)possibility of Obfuscating Programs, Journal of the ACM, 59, No. 2, Jan. 2012, pp. 1-48.

(Continued)

*Primary Examiner* — Khalil Naghdali
(74) *Attorney, Agent, or Firm* — Bell & Manning, LLC

(57) ABSTRACT

A method for encrypting logic includes generating, by a computing system, locking logic for inclusion in a logic circuit. The locking logic is generated based at least in part on an error rate and an attack complexity. The method also includes inserting, by the computing system, a one-way function into the locking logic. The method further includes applying, by the computing system, obfuscation logic to the logic circuit, where the obfuscation logic is applied on top of the locking logic.

18 Claims, 14 Drawing Sheets

(56) References Cited

OTHER PUBLICATIONS

Baumgarten, Alex, et al., Preventing IC Piracy Using Reconfigurable Logic Barriers, IEEE Design & Test of Computers, Jan. 2010, pp. 66-75.
Canetti, Ran, Towards Realizing Random Oracles: Hash Functions that Hide All Partial Information, Advances in Cryptology—Crypto '97. Crypto 1997. Lecture Notes in Computer Science, vol. 1294, 1997, pp. 455-469.
Canetti, Ran, et al., Obfuscating Point Functions with Multibit Output, Advances in Cryptology—Eurocrypt 2008. Eurocrypt 2008. Lecture Notes in Computer Science, vol. 4965, 2008, pp. 489-508.
Canetti, Ran, et al., Obfuscation of Hyperplane Membership, In: Micciancio D. (eds) Theory of Cryptography. TCC 2010. Lecture Notes in Computer Science, vol. 5978., 2010, pp. 72-89.
Cook, James, et al., Goldreich's One-Way Function Candidate and Myopic Backtracking Algorithms, In: Reingold O. (eds) Theory of Cryptography. TCC 2009. Lecture Notes in Computer Science, vol. 5444, 2009, pp. 521-538.
Coudert, Olivier, On Solving Binate Covering Problems, DAC '96 Proceedings of the 33rd annual Design Automation Conference, Jun. 3-7, 1996, pp. 197-202.
Dupuis, Sophie, et al., A Novel Hardware Logic Encryption Technique for thwarting Illegal Overproduction and Hardware Trojans, IEEE 20th International On-Line Testing Symposium (IOLTS), Jul. 7-9, 2014, pp. 49-54.
Garg, Sanjam, et al., Candidate Indistinguishability Obfuscation and Functional Encryption for All Circuits, SIAM J. Comput., 45(3), 2013, pp. 882-929.
Goldreich, Oded, Candidate One-Way Functions Based on Expander Graphs, In: Goldreich O. (eds) Studies in Complexity and Cryptography. Miscellanea on the Interplay between Randomness and Computation. Lecture Notes in Computer Science, vol. 6650, Dec. 3, 2000, pp. 76-87.
Goldwasser, Shafi, et al., On Best-Possible Obfuscation, In: Vadhan S.P. (eds) Theory of Cryptography. TCC 2007. Lecture Notes in Computer Science, vol. 4392, 2007, pp. 194-213.
Li, Meng, et al., Provably Secure Camouflaging Strategy for IC Protection, IEEE Transactions on Computer-Aided Design of Integrated Circuits and Systems, Sep. 7, 2017, pp. 14 pages.
Lynn, Benjamin, et al., Positive Results and Techniques for Obfuscation, In: Cachin C., Camenisch J.L. (eds) Advances in Cryptology—Eurocrypt 2004. Eurocrypt 2004. Lecture Notes in Computer Science, vol. 3027, 2004, pp. 20-39.
Rajendran, Jeyavijayan, et al., Logic Encryption: a Fault Analysis Perspective, Proceedings of the Conference on Design, Automation and Test in Europe, Mar. 12-16, 2012, pp. 953-958.
Rajendran, Jeyavijayan, et al., Security Analysis of Integrated Circuit Camouflaging, CCS '13: Proceedings of the 2013 ACM SIGSAC conference on Computer & communications security, Nov. 4-8, 2013, pp. 709-720.
Rajendran, Jeyavijayan, et al., Fault Analysis-Based Logic Encryption, IEEE Transactions on Computers, vol. 64, No. 2, Feb. 2015, pp. 410-424.
Roy, Jarrod A., et al., EPIC: Ending Piracy of Integrated Circuits, Computer, vol. 43, No. 10, Oct. 2010, pp. 30-38.
Shamsi, Kaveh, et al., AppSAT: Approximately Deobfuscating Integrated Circuits, IEEE International Symposium on Hardware Oriented Security and Trust (HOST), 2017, pp. 46-51.
Shen, Yuanqi, et al., Double DIP: Re-Evaluating Security of Logic Encryption Algorithms, GLSVLSI '17 Proceedings of the on Great Lakes Symposium on VLSI 2017, May 10-12, 2017, pp. 179-184.
Subramanyan, Pramod, et al., Evaluating the Security of Logic Encryption Algorithms, 2015 IEEE International Symposium on Hardware Oriented Security and Trust (HOST), May 5-7, 2015, 7 pages.
Valiant, L.G., A Theory of the Learnable, Communications of the ACM, vol. 27, No. 11, Nov. 1984, pp. 436-445.
Wee, Hoeteck, On Obfuscating Point Functions, STOC '05 Proceedings of the thirty-seventh annual ACM symposium on Theory of computing, May 22-24, 2005, pp. 523-532.
Xie, Yang, et al., Mitigating SAT Attack on Logic Locking, In: Gierlichs B., Poschmann A. (eds) Cryptographic Hardware and Embedded Systems—CHES 2016. CHES 2016. Lecture Notes in Computer Science, vol. 9813, Aug. 4, 2016, pp. 127-146.
Yasin, Muhammed, et al., SARLock: SAT Attack Resistant Logic Locking, IEEE International Symposium on Hardware Oriented Security and Trust (HOST), May 3-5, 2016, pp. 236-241.
Yasin, Muhammed, et al., On Improving the Security of Logic Locking, IEEE Transactions on Computer-Aided Design of Integrated Circuits and Systems, vol. 35, No. 9, Dec. 22, 2015, pp. 1411-1424.
Zhou, Hai, Chapter 9: Structural Transformation-Based Obfuscation, In: D. Forte et al. (eds.), Hardware Protection Through Obfuscation, 2017, pp. 221-239.

* cited by examiner

US 10,902,098 B2

LOGIC ENCRYPTION FOR INTEGRATED CIRCUIT PROTECTION

CROSS-REFERENCE TO RELATED APPLICATION

The present application claims the priority benefit of U.S. Provisional Patent App. No. 62/531,021 filed on Jul. 11, 2017, the entire disclosure of which is incorporated by reference herein.

GOVERNMENT LICENSE RIGHTS

This invention was made with government support under Grant No. 1651695 awarded by the National Science Foundation. The government has certain rights in the invention.

BACKGROUND

Logic encryption (or logic locking) is a technique to manipulate a given combinational circuit with an added key input to help ensure that the encryption circuit will only function as the original one under a specific key value that is difficult to obtain or figure out. Logic encryption can be used for intellectual property protection, integrated circuit production control, Trojan prevention, to prevent reverse engineering, and many other applications in hardware security. Circuit camouflaging, or obfuscation, refers to a technique in which ambiguity is intentionally introduced in the layout to make reverse-engineering difficult or impossible. Such circuit camouflaging can also be modeled as logic encryption with keys to encode different possibilities.

SUMMARY

An illustrative method for encrypting logic includes generating, by a computing system, locking logic for inclusion in a logic circuit. The locking logic is generated based at least in part on an error rate and an attack complexity. The method also includes inserting, by the computing system, a one-way function into the locking logic. The method further includes applying, by the computing system, obfuscation logic to the logic circuit, where the obfuscation logic is applied on top of the locking logic.

An illustrative system to encrypt logic includes a memory and a processor operatively coupled to the memory. The processor is configured to generate locking logic for inclusion in a logic circuit, where the locking logic is generated based at least in part on an error rate. The processor is also configured to insert a one-way function into the locking logic. The processor is further configured to apply obfuscation logic to the logic circuit, where the obfuscation is applied on top of the locking logic.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1A:
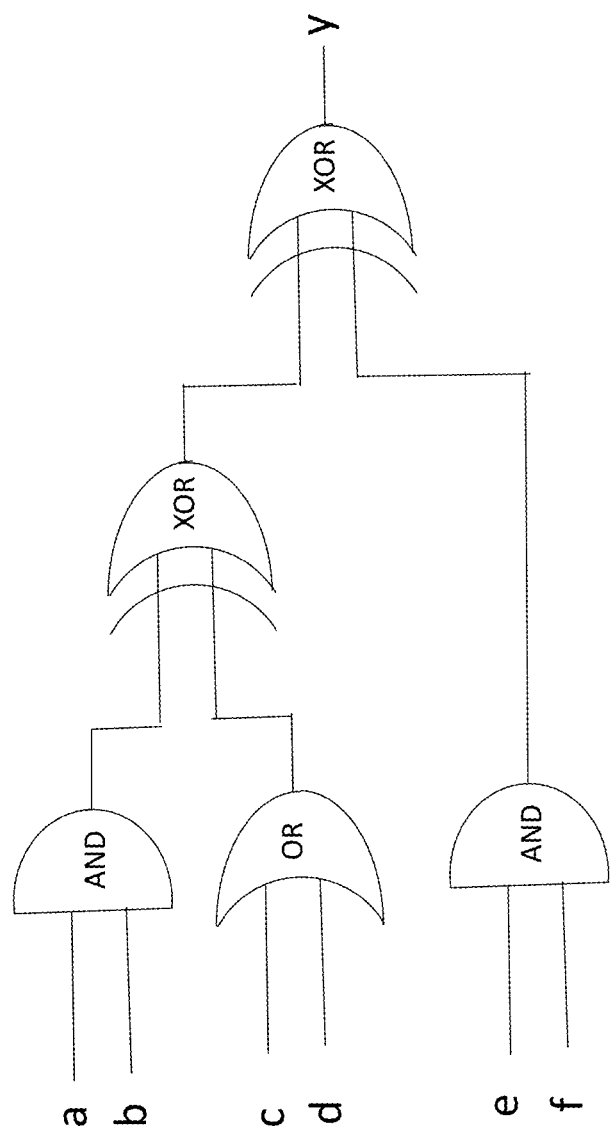
FIG. 1A depicts a logic circuit in accordance with an illustrative embodiment.

Logic encryption is an important hardware security technique that introduces keys to modify a given combinational circuit in order to lock the functionality from unauthorized uses. Traditional methods of logic encryption are ad hoc approaches that involve inserting lock gates with keys on randomly selected signals in the original logic circuit. Such techniques can be vulnerable to attack. For example, a Boolean Satisfiability (SAT)-based attack has been shown to successfully defeat traditional logic encryption systems. Different approaches to logic encryption such as SARLock and Anti-SAT have been developed to defend against such an SAT-based attack. SARLock, which was inspired by the difficult case of an and-tree, ensures that each wrong key can only be excluded by one input. Anti-SAT encryption is a technique where one key has at most one wrong input, but one input may exclude many wrong keys. However, SARLock and Anti-SAT logic encryption techniques are still vulnerable and have extremely low error rates. Specifically, both SARLock and Anti-SAT have $2^{-n}$ error rate (i.e. one input is wrong on each wrong key). As a result, such techniques are unable to protect against a random guess attack unless they are combined with other encryption methods.

The remedies such as SARLock and Anti-SAT combined with traditional encryption techniques can help make any SAT-based exact attack (i.e. getting the correct key) exponentially expensive. However, such systems are still vulnerable to approximate attacks that can return a key with very low error rate. Double DIP and AppSAT are examples of current approaches for approximate attacks to logic encryption.

Described herein is a system and process for logic encryption that provides a complete understanding on the design space and the trade-off between error rate and attack complexity. An efficient general design scheme is derived and some specific designs are provided. Also described herein is insertion of a one-way function to burden a SAT engine, and a method to obfuscate the whole design. In addition, as an application of the present designs, also described is a scientific encryption benchmark for approximate attacks. The encryption designs and obfuscation techniques described herein have been tested against a SAT-based attack, and the results have verified the robustness of the embodiments described herein.

In developing the techniques described herein, the inventor began with a basic understanding that there are two entangled goals in logic encryption: locking and obfuscation. Locking is a logical request to make sure that the correct behavior only happens when a correct key is applied and that the correct key cannot be easily figured out by studying the logic of the encryption circuit. Obfuscation is a structural request to make sure that the correct circuit cannot be revealed by any structural analysis of the encryption circuit.

It is believed that the entangled goals of locking and obfuscation are one cause of the use of ad hoc approaches in logic encryption. Therefore, one goal is to separate the two concerns starting from the beginning. By investigating the logic of all possible encryptions for a given function, a theory for logic encryption was developed that captures the whole design space and the relation between a design and its attack complexity. With error rate as a design goal, the relation between error rate and attack complexity was established. Both minimal and average attack complexities are considered herein, and it has been determined that there is a connection between attack complexity and error numbers such that their product cannot be larger than $n2^n$, even for average attack complexity.

The designs described herein were initially investigated without any concern on the size of the encryption circuits. Fortunately, when the size constraint is considered, it was found that the above bound can still be realized by a linear-sized encryption circuit. The benefit comes from the modulating of the keys by the normal inputs with XOR gates, and based on this, a general logic encryption scheme is proposed. In order to further thwart SAT-based logic analysis attacks, it is also proposed to insert Goldreich's one-way function in the scheme to increase the running time for SAT engines.

Circuit obfuscation is also applied to the logic designs to hide any structural vulnerability. As discussed herein, it has been shown that resynthesis is complete for the best-possible obfuscation, and it is proposed to perform resynthesis on the logic encryption designs described herein to protect them from structural analysis attacks.

The present designs also consider approximate attacks. It can be difficult to measure the performance of an approximate attack, since the error rate cannot be measured on the number of key bits that are the same as the correct one, and it is difficult to exactly measure error rate requests to simulate all input combinations. To overcome these difficulties, a suite of scientific benchmarks for approximate attacks has been developed. On these benchmarks, different keys have different error rates, which can be calculated based on the key.

Figure 1B:
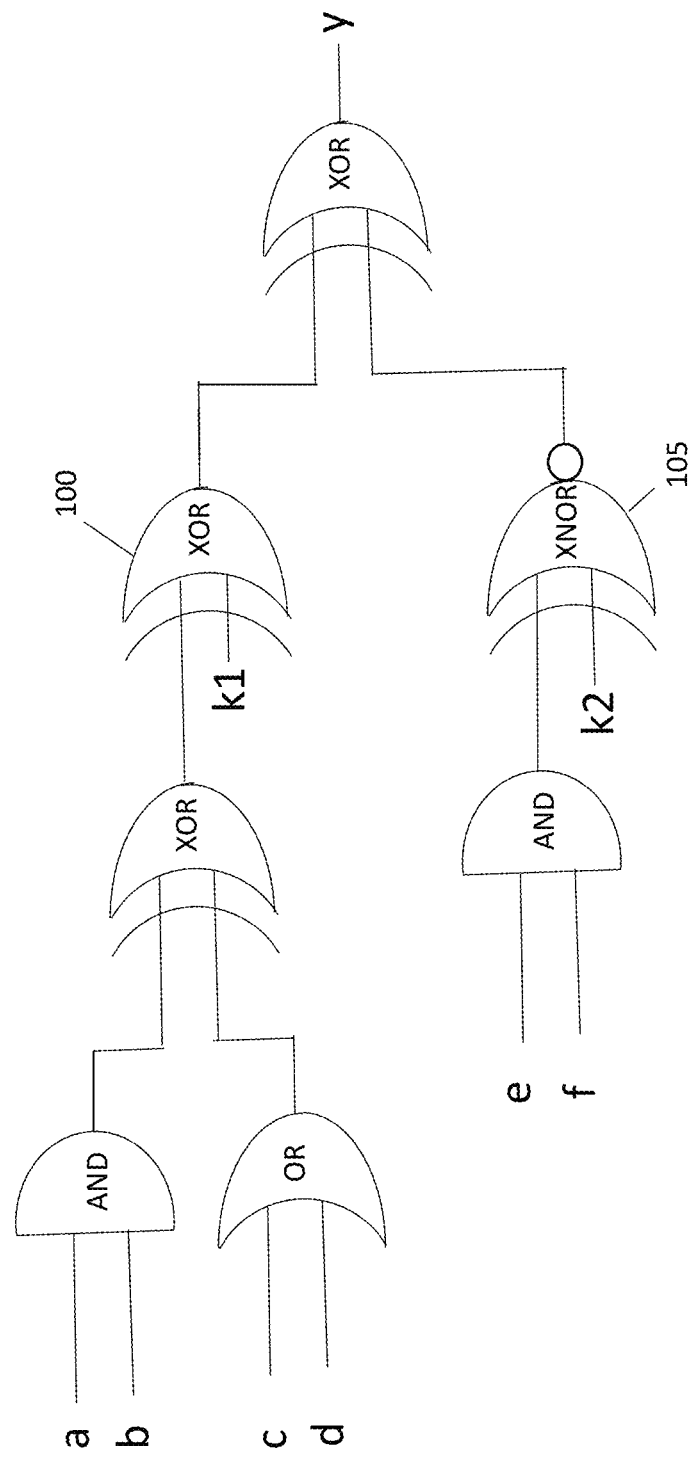
FIG. 1B depicts the logic circuit of FIG. 1A with first encryption logic in the form of lock gates in accordance with an illustrative embodiment.
Figure 1C:
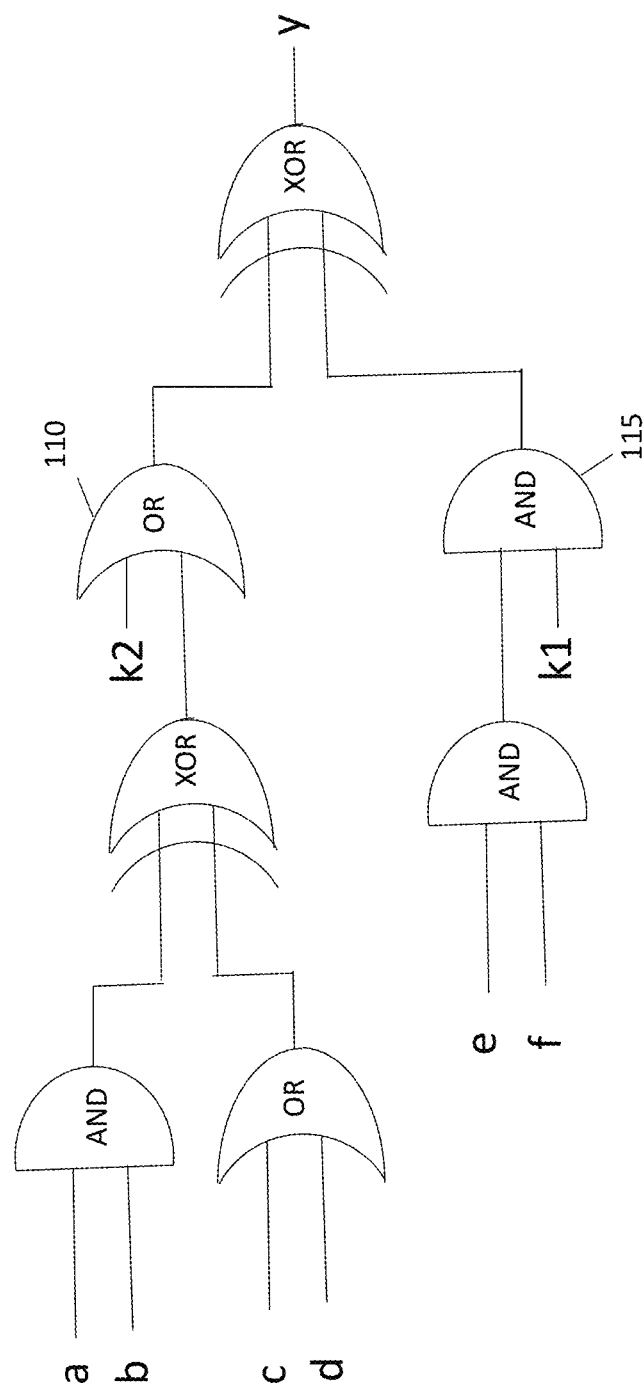
FIG. 1C depicts the logic circuit of FIG. 1A with second encryption logic in the form of lock gates in accordance with an illustrative embodiment.

There exist many different ways to implement logic encryption. However, they are all based on the general idea of iteratively finding a signal at random in an original circuit and inserting a lock gate (mostly an XOR) with a key. Examples of such techniques are depicted in FIGS. 1A-1C. Specifically, FIG. 1A depicts a logic circuit in accordance with an illustrative embodiment. FIG. 1B depicts the logic circuit of FIG. 1A with first encryption logic in the form of lock gates 100, 1005 in accordance with an illustrative embodiment. FIG. 1C depicts the logic circuit of FIG. 1A with second encryption logic in the form of lock gates 110, 115 in accordance with an illustrative embodiment. These techniques also try to prevent circuit analysis and simple testing-based attacks by carefully selecting the lock gate locations and doing resynthesis afterwards.

An attacker is generally assumed to have access to the encryption circuit either by reverse-engineering or through other ways. The attacker is also assumed to have a blackbox access to the original circuit, for example, through a product purchase on the open market. Since almost all product integrated circuits (ICs) are sequential circuits, the combinational circuit assumption used herein assumes an access to the scan-chain. With this attack model in mind, the SAT-based attack (proposed by Subramanyan et al.) can effectively defeat almost all of the traditional logic encryption methods. The SAT-based attack is presented as pseudo-code in Algorithm 1 below.

Algorithm 1: SAT Attack Algorithm
Require: An encryption circuit g(x,k) and original Boolean function f(x).
Ensure: Correct key k* such that g(x,k*)≡f(x).
1: while $\hat{x}$=SAT(g(x,k)*g(x,k1)) do
2: $\hat{y}$=f($\hat{X}$);
3: g(x,k)=g(x,k)∧(g($\hat{X}$,k)=$\hat{y}$);
4: g(x,k1)=g(x,k1)∧(g($\hat{x}$,k1)=$\hat{y}$);
5: endwhile
6: k*=SAT(g(x,k)).

The main step in the SAT-based attack is to use two copies of the encryption circuit with the same input but different keys under a given constraint to check whether it is still possible to generate different outputs. Such input patterns are called Differentiating Input Patterns (DIPs). Each DIP is then used to query the original circuit blackbox to get the correct output. The DIP with output is then used to further constrain the keys under consideration.

The idea of using DIP is to exclude at least one wrong key from consideration. However, it has been recognized that many of the DIPs may each exclude a large number of wrong keys. That is the main reason for the effectiveness of the attack. If a DIP was able to only exclude a very small number of wrong keys, then the attack would take a very long time to find the correct key and be less effective. Approaches to better protect against the use of DIP have error rates of $2^{-n}$, and can therefore be effectively defeated by approximate attacks such as Double DIP and AppSAT.

Problem Definition

The logic encryption problem can be formulated as follows. Given a Boolean function f: $B^n$ -> B represented by a multi-level netlist of Boolean gates, find a Boolean function g: $B^{2n} \to B$ also as a multi-level netlist, such that i) There is a random Boolean n-vector $k^*$ such that $g(x,k^*) \equiv f(x)$; ii) The netlist size of g is only a polynomial of that of f; and iii) With the netlist of g and a black-box access to f, it is difficult to "discover" f.

The first two requirements are straightforward: the first one means there is at least one correct key to decrypt the logic; the second one only allows a polynomial blow-up of the circuit size. For performance critical applications, the netlist depth of g can be bounded.

There are two different aspects associated with the third requirement: what it means to "discover" f, and how to measure the difficulty. One way to discover f is to find $k^*$ or any k such that $g(x,k) \equiv h(x)$. As noted above, it has been determined that almost all existing logic encryption algorithms can be effectively decrypted by a SAT-based attack. The effectiveness is measured by the number of inputs that are queried on the black-box of f, which is bounded by a polynomial of n. In addition, it also depends on the efficiency of solving a SAT problem on all these inputs for a key.

Immediately after the SAT-based attack was introduced, SARLock and Anti-SAT were introduced as possible remedies. As discussed above, SARLock utilizes an and-tree structure to thwart the SAT-based attack by ensuring that the number of inputs to be queried is at least exponential. Anti-SAT is a systematic way to design logic encryptions that will also request the SAT-based attack to query an exponential number of inputs. One drawback for both SARLock and Anti-SAT approaches is that when applying an arbitrary key k, the error rate is extremely low. Here the error rate is defined as the percentage of inputs x that will generate wrong output, meaning, $g(x,k) \neq f(x)$. For both SARLock and Anti-SAT, there is exactly one input with wrong output for every $k \neq k^*$.

The low error rates in SARLock and Anti-SAT entice a new type of attacks: approximation attacks. In an approximation attack, a random guess k on the key will give a circuit g(x,k) that is almost correct, where a wrong result will happen on at most one input. The justification for such approximation attacks is that the attacker is very sure that the unauthorized circuit can be sold on the market with an extremely low probability of being caught. Furthermore, any catch of a discrepancy on a given input will help the attacker to correct the key.

From the attacker's perspective, another advantage of approximate attacks is that, under a wrong key with extremely low error rate, the attacker now not only pirates on one's intellectual property or sensitive data, but also places in it a perfect Trojan horse. This is because an extremely low error rate means that it will be extremely difficult to detect the Trojan. In this sense, one can argue that approximate attacks are even more malicious than exact attacks, and should be seriously considered and prevented in logic encryption.

Accordingly, the present designs were developed to consider an approximation attack that can successfully discover f in the problem formulation. Also when considering whether a logic encryption is difficult to decrypt, it is not sufficient to consider only existing attack methods such as SAT-based attack and 2DIP attack, since one cannot predict what new attack methods will be developed in the future. In accordance with cryptography practices, probabilistic learning is considered as the most general form for discovering f.

Therefore, decryption is viewed as finding a key k such that g(x,k) is Probabilistically Approximately Correct (PAC) for f(x).

Logic Encryption

Since each iteration of an SAT-based attack is to find an input that can differentiate two keys on g(x,k) and then to constrain the keys by the evaluation of that input on the original circuit f(x), a Shannon decomposition of the encryption circuit g(x,k) on the input x is proposed. The Shannon decomposition provides the following equation:

$$g(x,k) = \bigvee_{i=0}^{2^n-1} m_i(x) \wedge g(i,k),$$

where $m_i(x)$ is the i th minterm of x, and g(i,k) is a Boolean function of only k.

Under the requirement of $g(x,k^*) = f(x)$, it is apparent that $g(i,k^*) = f(i)$ for all $i \in 0 \ldots 2^n-1$. In terms of minterms of k, this means that $m_{k^*}(k) \Rightarrow (g(i,k)=f(i))$ for all $i \in 0 \ldots 2^n-1$. In the same vein, if one wants a wrong key w to generate a wrong output on the input i, the relation $m_w(k) \Rightarrow (g(i,k) \neq f(i))$ is to be satisfied. In other words, if one wants to have a mismatch on input i for key j, the minterm $m_j(k)$ in g(i,k) is included if f(i)=0. The opposite is done if f(i)=1.

The error number for a given key j is defined as the number of mismatches on all inputs. This can be designed by including (when f(i)=0) or excluding (when f(i)=1) $m_j(k)$ from g(i,k) on any desired number of inputs. For example, if the error number is to be $2^n$ for any wrong key, the logic encryption is:

$$g(x,k)=f(x)m_{k^*}(k) \vee \neg f(x) \gtrsim m_{k^*}(k).$$

However, such a design can be decrypted by the SAT-based attack since one iteration will find the key $k^*$.

In addition to error number, another important aspect of logic encryption design is the difficulty for attacks. A first consideration is exact attacks, especially the SAT-based attack. In the above framework, a query on input i will add the constraint g(i,k)=f(i) to the key constraint. If the conjunction of existing contraints implies g(j,k)=f(j) for any input j not queried yet, it makes the query unnecessary. Therefore, the number of queries needed for an exact attack is dependent on the logic relations among g(i,k)=f(i) for all i and also the order on which each input i is queried. Since any SAT engine has a built-in randomness, the average number of queries is used as the measure, and this value can be complicated to calculate.

Figure 2:
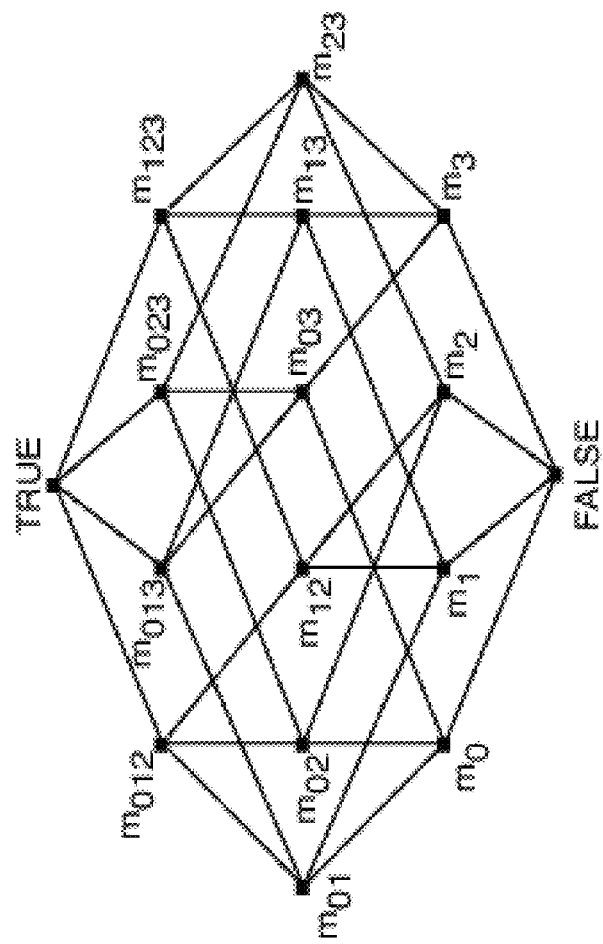
FIG. 2 depicts a complete lattice of all possible 2-input 1-output boolean functions, with edges representing implications in accordance with an illustrative embodiment.

It is noted that each function g(i,k)=f(i) can be an arbitrary function with n inputs and one output. The set of all such functions is denoted as $[B^n \to B]$. The total number of functions in this set is $2^{2^n}$. In order to study their logic relations, the complete lattice given by $([B^n \to B], \vee, \wedge)$ is examined. For uniformity, each function is viewed as a subset of minterms of k. As an illustration, the complete lattice of all possible functions $[B^2 \to B]$ is shown in FIG. 2. In FIG. 2, the top element is TRUE and the bottom element FALSE. The row above FALSE has all the minterms, and the row below TRUE has the negations of all the minterms. The partial order on the lattice is the implication relation $\Rightarrow$.

A next step is to map the $2^n$ number of functions g(i,k)=f(i) to the complete lattice of FIG. 2. Some of these functions may collide with each other, thus the total number of elements mapped on the lattice may be smaller. For example, in the above encryption with $2^n$ as an error number, there is only one mapped element $m_{k*}(k)$, which explains why decrypting it requests only one query. As another example, one can consider the following AND-tree:

$$g(x, k) = \bigwedge_{i=0}^{n-1} x_i \oplus k_i, \quad f(x) = \bigwedge_{i=0}^{n-1} x_i.$$

The Shannon decomposition of the AND-tree is $$g(x, k) = \bigvee_{i=1}^{2^n-1} m_i(x)m_{\bar{i}}(k),$$

where $\bar{i}$ is one's complement of i. The functions $m_i(k)=f(i)$ map to a minterm $m_0(k)$, and negations $m_i(k)$ for all other $i \neq 0 \in 0 \ldots 2^n-1$. These negations are each independent of the other, but they are all implied by $m_0(k)$. The minimal number of queries for decryption is one, if the first input queried happens to be $i=2^n-1$. The maximal number of queries is $2^n-1$, while any number in between is possible. A careful analysis indicates that the average number of queries needed is still exponential, which explains why the decryption is expensive.

The general case will have $2^n$ mapped functions in the lattice and there may exist complicated implication relations among different conjunctions of them, resulting in the following lemma. Lemma 1: Given a logic encryption $g(x,k)$ for a function $f(x)$, an DIP set D can exactly decrypt $g(x,k)$ if and only if the infimum of $\{g(i,k)=f(i)|i \in D\}$ is also the infimum of the functions $g(i,k)=f(i)$ for all $i \in 0 \ldots 2^n-1$ in the complete lattice $([B^n \rightarrow B], \vee, \wedge)$, in other words $$\wedge_{i \in D} g(i,k)=f(i) => \wedge_{i \in 0 \ldots 2^n} g(i,k)=f(i).$$

If a subset of functions $g(i,k)=f(i)$ forms a chain in the complete lattice, then the bottom element will imply all other elements. This means that the minimal number of queries needed for them is just one. However, the average number of inputs to query before finding the bottom one is $\Theta(\log m)$, where m is the number of elements in the chain.

On the other hand, given a subset of m functions for which none of them implies the other, determination of the average number of queries before finding the infimum can be complicated. In general, it depends on the difference between the common minterms of the whole set and those of an arbitrary subset. Any function that excludes at least one minterm that is common in all other functions is to be queried. This property can be used to make sure that m is the minimum number of queries needed. For example, this is the case for the $2^n-1$ negations $m_i(k)$ in the and-tree.

Besides the attack complexity, another design criteria of an encryption circuit is the error rate. For any wrong key, the error rate is the ratio of inputs generating wrong outputs. In other words, the error rate is the error number divided by the total number of possible inputs ($2^n$). All existing remedies against the SAT-based attack have an extremely low error rate of $2^{-n}$. Therefore, the present designs consider logic encryptions that have both exponential SAT attack complexity and substantial error rates.

In the proposed system, the error number for k is given by $$\text{error}(k) \triangleq \sum_{i=0}^{2^n-1} g(i, k) \neq f(i).$$

The error number for each input i can also be symetrically defined as $$\text{error}(i) \triangleq \sum_{k=0}^{2^n-1} g(i, k) \neq f(i),$$

which can be measured as the number of minterms of k not included in function $g(i,k)=f(i)$. Even though requesting error (k) to be exponential for every wrong k is different from requesting error (i) to be exponential for every input i, it can be seen that they are closely related since the sum is the same. That is, since $$\sum_{i=0}^{2^n-1} \text{error}(i) = \sum_{k=0}^{2^n-1} \text{error}(k).$$

Figure 11:
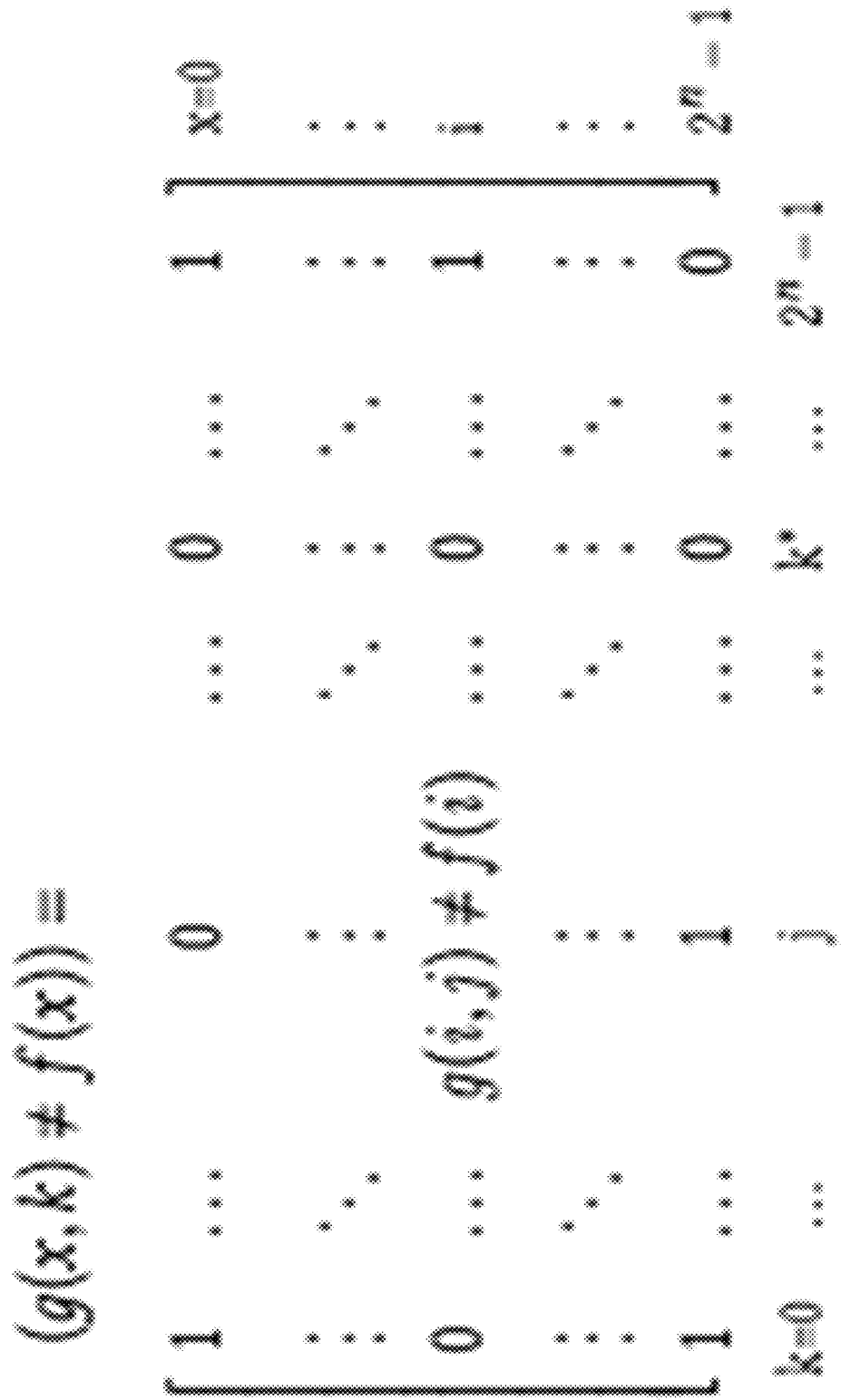
FIG. 11 depicts an error matrix for use in determining encryption logic design in accordance with an illustrative embodiment.

More importantly, one can also view the logic encryption design to determine an error matrix, which is depicted in FIG. 11. In the error matrix of FIG. 11, each row represents a given x value from 0 to $2^n-1$, and each column represents a given k value also from 0 to $2^n-1$. The element at (i, j) represents the value of $g(i, j) \neq f(i)$, that is, an error at $g(i, j)$. The error number for k is the number of ones in column k. The minimal error number is the minimal number of ones in any column with one. On this error matrix, the decryption problem can be formulated as a cover problem: a subset of rows (inputs x) are sufficient if and only if they cover all the columns with ones.

Referring again to FIG. 11, the goal is to design a matrix such that the minimal number of ones for any column with one is large, while the minimal (or average) number of rows needed to cover them is also large. However, the following lemma captures a natural contention between these two goals. It also explains why all the existing SAT-resilient approaches have extremely small error rates.

Lemma 2: In any given encryption $g(x,k)$ for any function $f(x)$, if the minimal error number for any wrong key is M, the minimal attack complexity is N, then $MN \leq 2^n$. Proof of Lemma 2: Assume a minimal cover of size N. Each row in the cover must have at least one column that is uniquely covered by this row. Otherwise, this row can be removed without affecting the coverage, contradicting with the assumption that the cover is minimal. On this unique column, there must be at least M ones. Furthermore, no pair of the ones on the N unique columns can be in the same row. Otherwise, one can add the row with the pair and delete two corresponding rows from the cover, contradicting with the assumption of minimal cover. There are at least N unique columns, each of which has at least M ones, which cannot share any common rows. The total number of rows is $2^n$. Therefore, it can be seen that $MN \leq 2^n$.

It is also worth considering whether one can escape from this contention if the average attack complexity is considered instead of the minimal attack complexity. Unfortunately, not much can be done because of the following lemma. Lemma 3: In any given encryption $g(x,k)$ for any function $f(x)$, if the minimal error number for any wrong key is M, then $n2^n/M$ random DIP queries will decrypt it with a probability at least $1-(2/e)^n$. Proof of Lemma 3: Consider a sequence of N independent random selection of rows and calculate the probability that they are still not a cover. Note that a DIP selection in an SAT-based attack is dependent on existing selections and also no repeated selection is allowed. Therefore, such a probability for independent random selection is an upper bound of the probability for dependent DIP selections.

If each column is considered to have a one in it, there must be at least M ones. Therefore, an independent random selection of a row will not cover it with a probability at most $1-M/2^n$. A sequence of N selections will not cover it with a probability at most $(1-M/2^n)^N$. There are at most $2^n-1$ such columns, thus, such selections will not form a cover with a probability at most $2^n(1-M/2^n)^N$. It can be shown that $(1-M/2^n)^{2^n}/M$ is monotonically increasing and converges to $e^{-1}$. Therefore, if $N=n2^n/M$, then $$2^n(1-M/2^n)^N \leq 2^n e^{-n} = (2/e)^n.$$

Fortunately, one can show that there does exist an encryption with both high attack complexity and high error numbers as indicated in the following theorem. Theorem 1: For any given $f(x)$, there exists a logic encryption $g(x,k)$ such that both the minimal attack complexity and the minimal error number are $2^{n/2}$. Proof of Theorem 1: This is a constructional proof. Given any $f(x)$, construct $g(x,k)$ as follows:

$$g(i,k) = \left( m_{k*} \vee \bigvee_{j=i}^{i+N} m_{j \bmod 2^n} \right) \equiv f(i),$$

where $N=2^n-2^{n/2}$. It is straightforward to check that error $(k)=2^{n/2}$ for any wrong k. One can also show that the minimum number of queries to attack $g(x,k)$ is $2^{n/2}$. This is because every query can remove at most $2^{n/2}$ minterms, and to remove $2^n-1$ minterms needs at least $2^{n/2}$ queries.

The above Theorem 1 is not always practical since the provided $g(x,k)$ may have exponential size. The more important problem is to find such an encryption with small size. In accordance with the present design theory, each function $g(i,k)=f(i)$ has to distinguish (thus to exclude) $2^{n/2}$ minterms. The request of small size on g forbids a different block for different $g(i,k)=f(i)$, otherwise there will be exponential number of blocks. Without loss of generality, let $g(0,k)=(m_{k*}+h(k))\equiv f(0)$ be the block shared by every $g(i,k)$ for $i \in 0 \ldots 2^n-1$. One way to get distinguished minterms from each $g(i,k)$ is to modulate k in $h(k)$ bit-wisely by i, that is, to make $$g(i,k)=(m_{k*}\vee h(k\oplus i))\equiv f(i).$$

Figure 3:
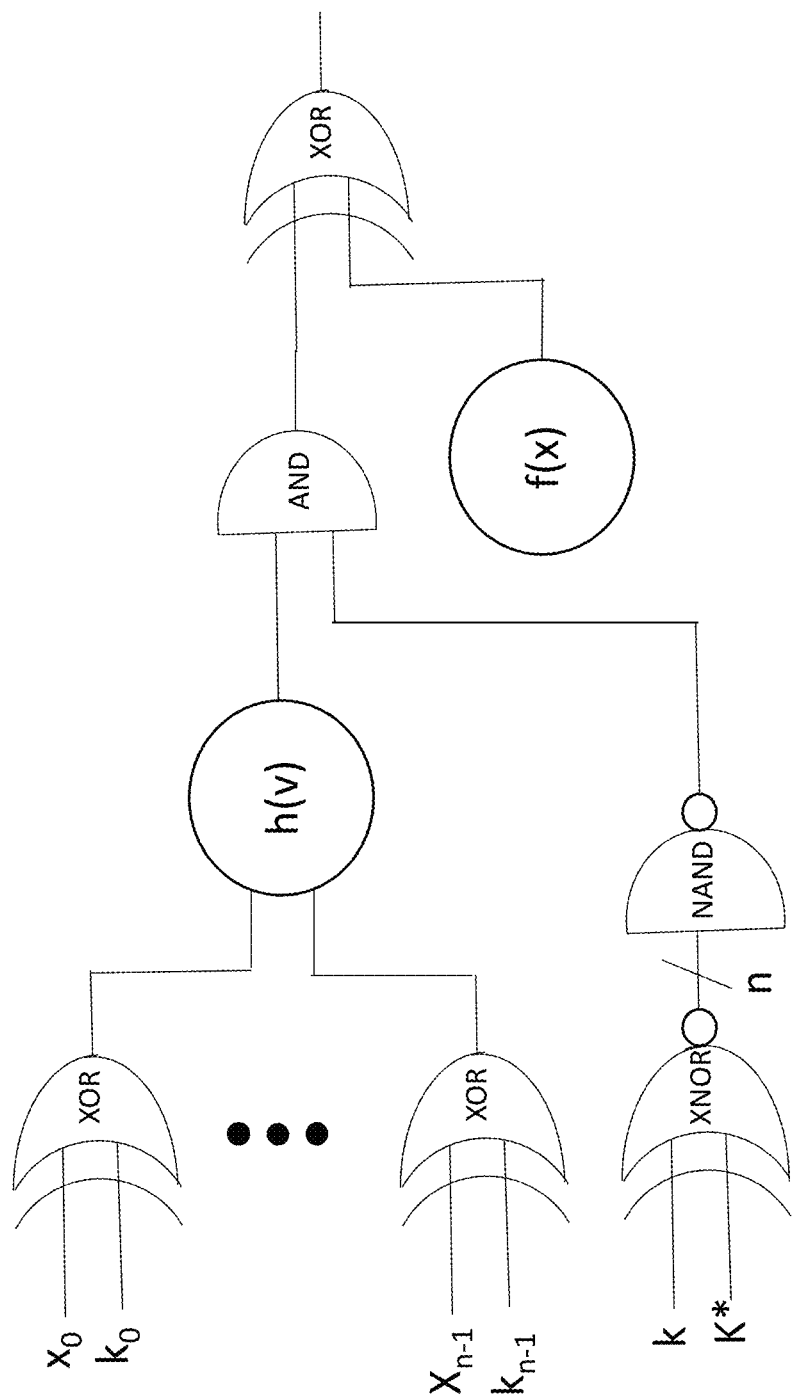
FIG. 3 depicts a general logic encryption scheme where h(v) has an on-set of size M in accordance with an illustrative embodiment.

In this case, there exists a general design as shown in FIG. 3, which is also given by the following formula, $$g(x,k)=(m_{k*}(k)\vee h(k\oplus x))\equiv f(x).$$

The correctness of this formula is stated in the following theorem. Theorem 2: If function $h: B^n \rightarrow B$ has an on-set of size M, then the logic encryption given in FIG. 3 will have an error number of M for every wrong key, and a minimal attack complexity of $2^n/M$.

Figure 4:
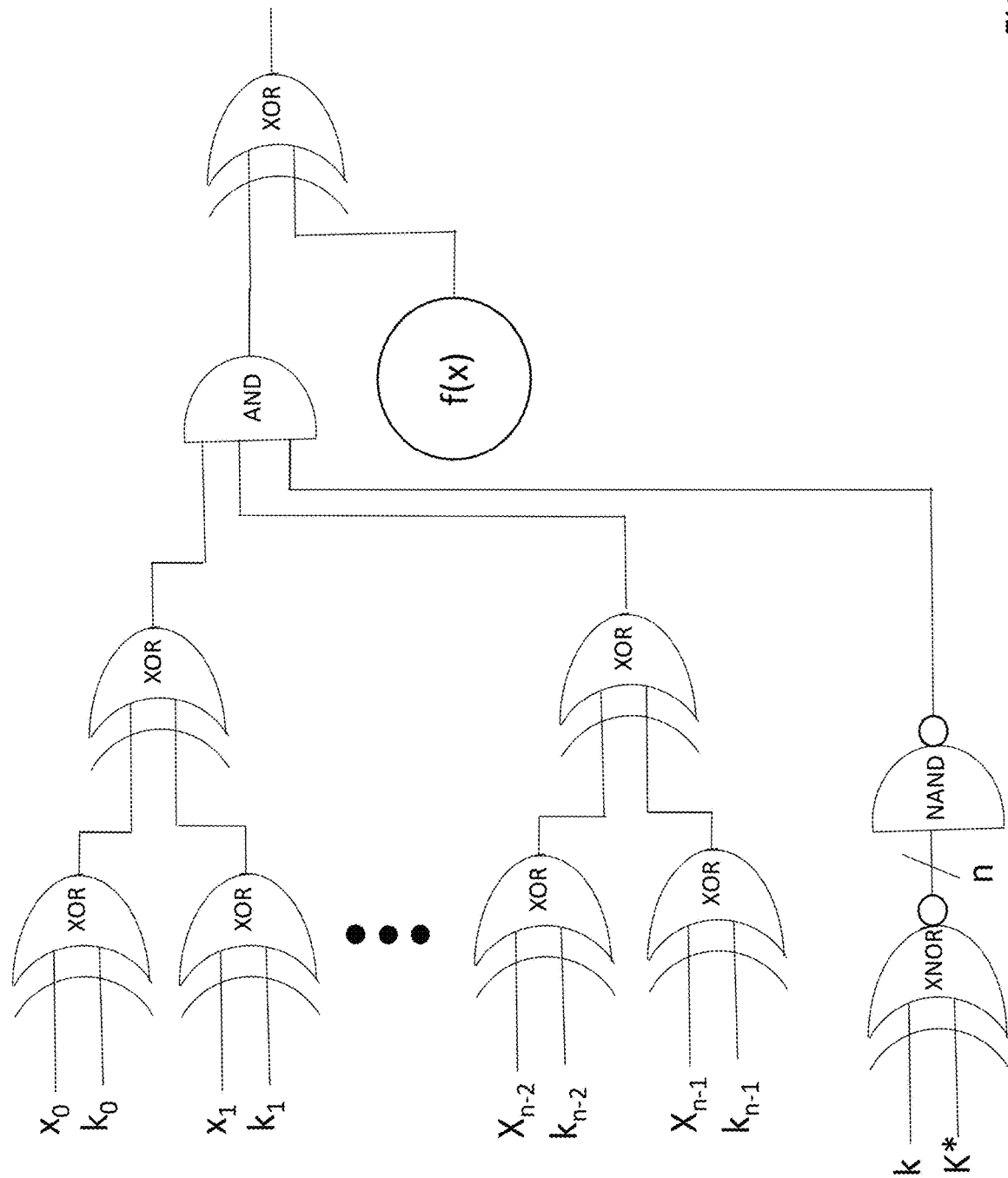
FIG. 4 depicts a logic encryption design with both exponential attack complexity and error number in accordance with an illustrative embodiment.

A simple design following the general scheme is to have $h(v)=\bigwedge_{i=0}^{n/2-1} v_{2i} \oplus v_{2i+1}$, as shown in FIG. 4. It can be seen that the on-set of the h function in this design is $2^{n/2}$. Therefore, it has $2^{n/2}$ as both the minimal attack complexity and the error number for every wrong key.

Insertion of One-Way Function

Increasing the number of required iterations in the SAT-based attack is just one way to increase the attack complexity. Another way is to increase the complexity of SAT instances in the DIP finding. For this purpose, hard instances for the SAT problem are identified and integrated into the logic encryption circuit. Cryptography is one of the areas to look for hard SAT instances.

One possibility is to use the advanced encryption standard (AES) as the hard instance. It is well known that AES is a complicated algorithm, with at least 10 cycles of repetition even for the smallest 128-bit key configuration. To be used in the encryption circuit, which is a combinational circuit, the AES has to be unrolled to make it combinational, which will increase its size. It can be estimated that AES will introduce substantial overhead on the circuit size.

Thus, it is proposed to use Goldreich's candidate one-way functions based on expander graphs as the hard instances inserted in logic encryptions. The benefits include that the Goldreich one-way functions are naturally combinational thus no unrolling is needed, that they are simple to implement and have only linear sizes in terms of the input size, and that their one-wayness has been thoroughly investigated and experimentally confirmed with SAT engines.

Goldreich's one-way functions are relatively straightforward to construct. There are two parameters to select: a connection degree d and a predicate P on d inputs. For any n-bit inputs, the one way function will compute each bit of its output by applying P on a random selection of d input bits. There are some criteria to follow. First, P should not be a linear sum or degenerate on the inputs. Second, if the connection between inputs and outputs is treated as a bipartite graph, it has to be an expander. The connection degree d can be very small, in O(log n) or even O(1).

A simple predicate based on a study of Goldreich's one-way functions is:

$$P(x_0, \ldots, x_{d-1})=x_0 \oplus x_1 \ldots \oplus (x_{d-2} x_{d-1}).$$

Experiments have been conducted with SAT engines on functions thus constructed. Even with d=5, an exponential increase of running time as a function of the input length n has been observed. Experiments also indicate that the Mini-Sat engine will take more than 10 seconds if the input length is 140. That provides strong evidence that such functions inserted in logic encryption can be beneficial.

There are two locations for inserting a one-way function into the general logic encryption scheme shown in FIG. 3. One is before the h function, and the other is before the key input to the circuit.

The advantage of the first location is that the function is mixed up well with the rest of the encryption circuit. Its drawback is that, combined with this random function, it is difficult to calculate the error rate and attack complexity of the encryption. However, if it is assumed that these random one-way functions have low collision rate (a collision means two different input mapped to the same output), the disturbance to the error rate and attack complexity will be minute.

On the other hand, even though the second location (before the key input) will not affect the h function or its on-set, it only provides the benefit of accurately calculating the attack complexity. The error rate with respect to the output of the one-way function is known, but it is still unknown with respect to the input of the one-way function. The drawback of the second location is its not mixing up with other part of encryption circuit. Even though obfuscation will be implemented by resynthesis of the whole encryption circuit, as discussed below, and this can mix the one-way function with other parts of the encryption logic, such a benefit may not justify the adaptation.

Figure 5:
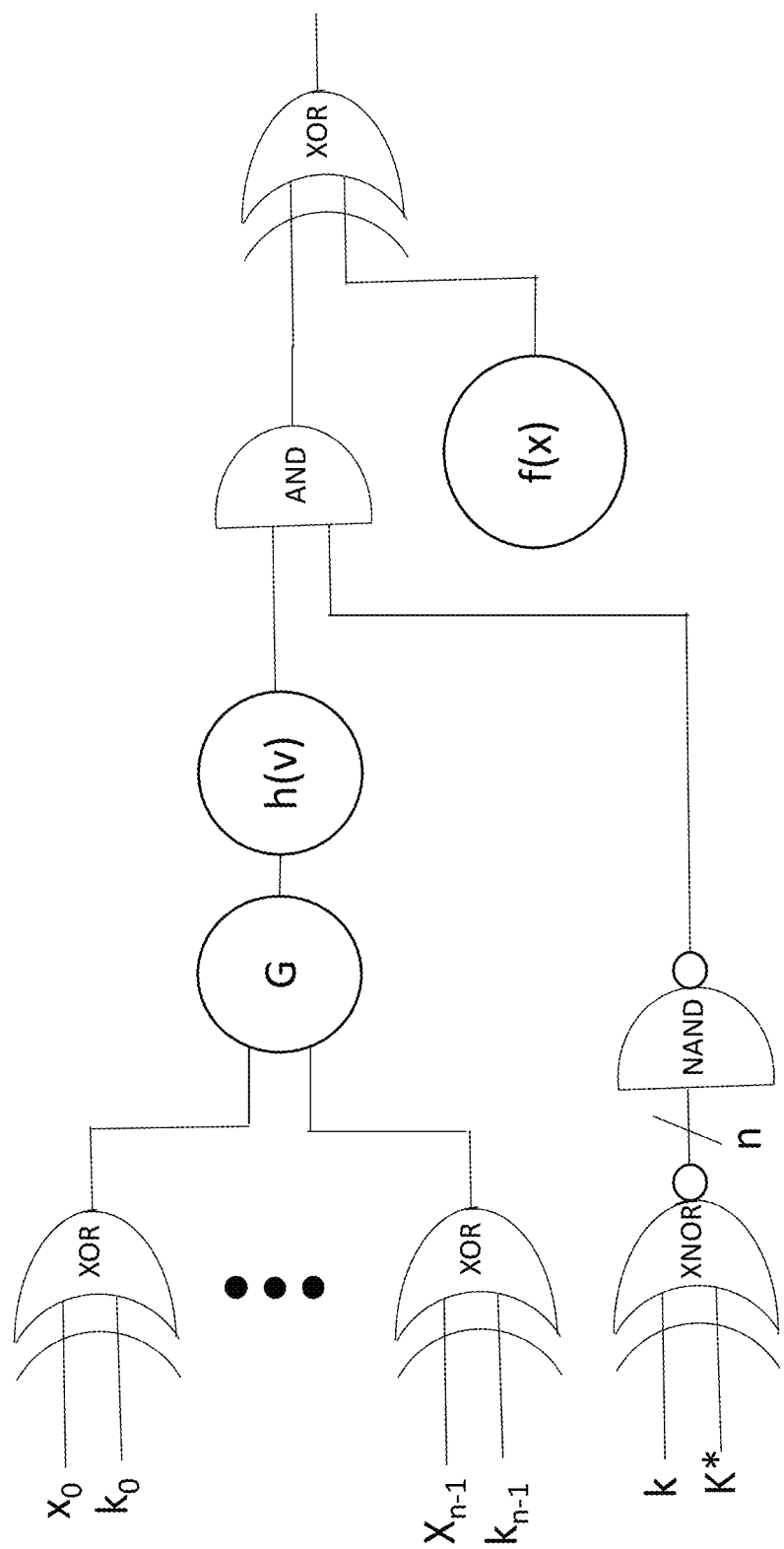
FIG. 5 depicts a logic encryption design with a one-way function, where G is Goldreich's one-way function, and h(v) has an on-set of size M in accordance with an illustrative embodiment.

Therefore, it is proposed to use the general logic encryption with a one-way function as shown in FIG. 5. In the logic circuit of FIG. 5, the G function is Goldreich's one-way function. A straightforward design could use d=5 with $$P(x_0, \ldots, x_4) = x_0 \oplus x_1 \oplus x_2 \oplus (x_3/x_4).$$

It is noted that it is not required to have a big one-way function to make the SAT engine infeasible to solve one iteration in the attack. This is because with one more iteration in the SAT-based attack, one instance of the encryption circuit will be added with one DIP into the conjunctiv normal form (CNF). Therefore, even though one instance of the one-way function may not be too difficult to solve, its effect will accumulate with each additional iteration, and make the process slower and slower.

Circuit Obfuscation by Resynthesis

As discussed above, there are two tangled goals in logic encryption: locking and obfuscation. Locking is a logical request to make sure that the almost correct behavior cannot happen when a wrong key is applied and an almost correct circuit cannot be easily figured out by studying the logic of the encryption circuit. Obfuscation is a structural request to make sure that the correct circuit cannot be revealed by any structural analysis of the encryption circuit.

The theory and designs discussed above achieve the goal of locking without considering obfuscation. In other words, the above-described encryption circuits are just an equivalent function of the obfuscated circuit that will be ultimately used. The design in FIG. 5 has vulnerabilities in terms of structural analysis attacks, including subcircuit identification and removal, or general learning. For example, the secret constant k* can be discovered in the circuit structure. Even if this is hidden, identifying f(x) and XORing another part of the circuit also makes it vulnerable. Therefore, circuit obfuscation is implemented to hide the secret k* and improve the vulnerable structure of the logic encryption.

A black-box obfuscation refers to an obfuscation that only leaks the same information as black-box invocations of the program. It has been proven that such a black-box obfuscation does not exist on general programs or circuits. A black-box obfuscation protects both the structure and logic of a circuit. It follows that it is impossible to achieve both logical locking and structural obscurity in obfuscation, which confirms the choice to separate logical locking from structural obfuscation in designs for logic encryption presented herein.

Because of the impossibility result of the black-box obfuscation, a weaker form of obfuscation, referred to as indistinguishability obfuscation, has been developed. An indistinguishability obfuscation of a circuit is such that it is computationally indistinguishable from the obfuscation of any other equivalent circuit. If an indistinguishability obfuscation is applied to the logic encryption designs described herein, then it is guaranteed that the obfuscated circuit is as secure as the obfuscated circuit started with any equivalent circuit.

Figure 6:
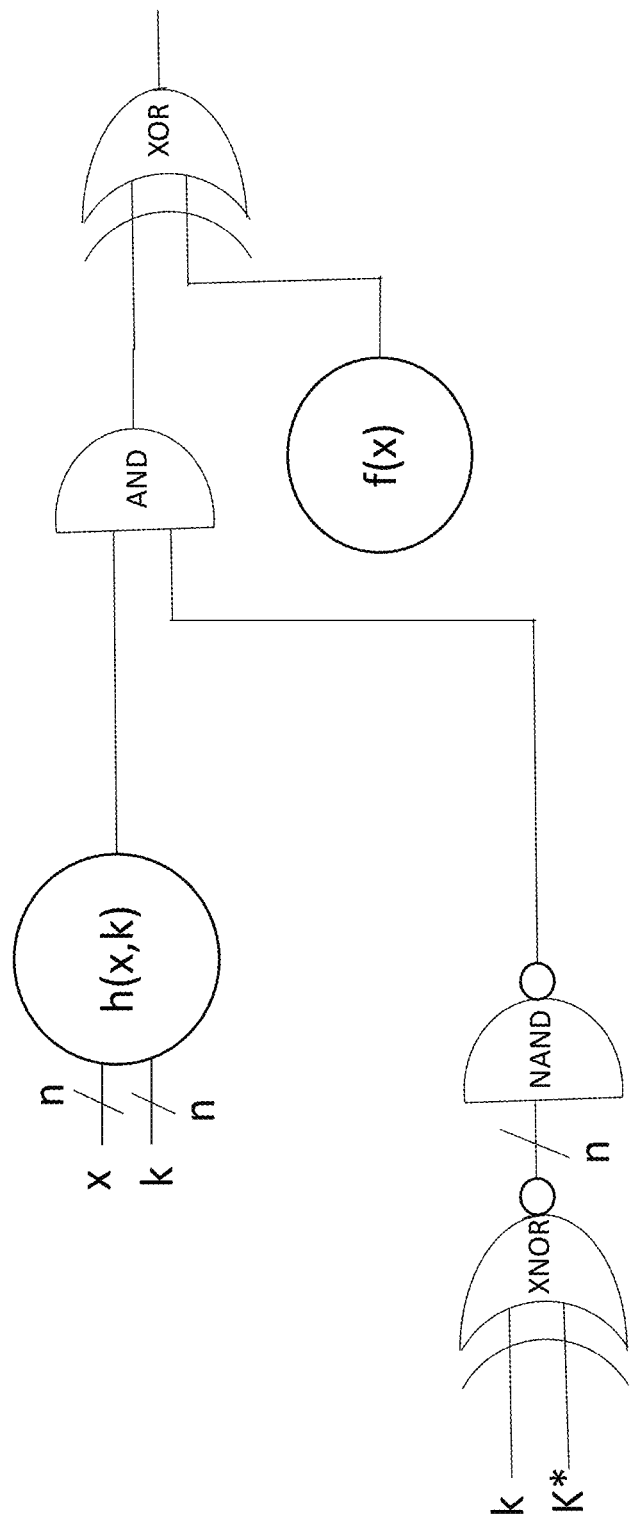
FIG. 6 depicts a circuit that is logically equivalent to any logic encryption g(x,k) for any function f(x) in accordance with an illustrative embodiment.

It can be proven that any logic encryption is logically almost equivalent to the general scheme in FIG. 3. The more precise statement is given in the following lemma. Lemma 4: Even though one cannot prove that every encryption should have the XOR of x and k, as discussed above, it may be the best choice for achieving the linear-size encryption. Any logic encryption g(x,k) for any function f(x) is logically equivalent to the circuit shown in FIG. 6. Proof of Lemma 4: For any logic encryption g(x,k), one can do the Shannon decomposition on x. The structure of g(x,k) is then studied based on whether g(x,k*)≠f(x), which gives us the XORing of f(x) with the remainder of the circuit. Since g(x,k*)=f(x), one has to make the subcircuit XORing with f(x) be zero if k=k*, which gives the ANDing of the k≠k* part. The remaining part is identified as h(x,k) shown in the figure.

There are a couple of points to note with respect to indistinguishability obfuscation. The first is about the obscurity capability of indistinguishability obfuscation. The definition of indistinguishability obfuscation does not specify what information can be hidden by the obfuscation. It only guarantees that it is indistinguishable from obfuscation of any equivalent circuit. Therefore, if every possible equivalent circuit is vulnerable, then even an indistinguishability obfuscation cannot make a circuit secure. However, based on the above lemma, if this is the case, then it follows that logic encryption is impossible, and nothing can be done to effectively protect the logic circuit.

The second consideration is with respect to the feasibility of indistinguishability obfuscation. However, a candidate distinguishability obfuscation that works for all circuits has recently been discovered, indicating that indistinguishability obfuscation is feasible in the present context. However, it is also known that indistinguishability obfuscation is an expensive process to be deployed for logic encryption.

An alternative definition of obfuscation is referred to as best-possible obfuscation. Intuitively, a best-possible obfuscation of a circuit can be as leaky as any circuit that is equivalent to the given circuit. It has been proven that any best-possible obfuscater is also an indistinguishability obfuscater, and for efficient obfuscation, they are equivalent. For logic encryption, the obfuscation is still an efficient combinational circuit. Thus, an indistinguishability obfuscater is also a best-possible obfuscater.

The present inventor has developed a sequential circuit locking and obfuscation technique based on the best-possible obfuscation. Structural transformation was applied, including retiming, resynthesis, sweep, and conditional stuttering to lock and then obfuscate a given sequential circuit. The present inventor has also proven that those operations are complete for best-possible obfuscation.

In logic encryption, the obfuscation starts with a combinational circuit and ends up with another combinational circuit. Lemma 5: For (combinational) logic encryption, a best-possible obfuscation can be done by a sequence of resynthesis. This lemma only provides a feasibility guarantee of obfuscation by resynthesis. Specific transformations are used to hide sensitive information and vulnerable structures.

One of the vulnerabilities in the general encryption scheme in FIG. 3 is the key checking k=k* and then disabling the flip of f(x). It has the same functionality and structure as the login process of many software systems. Embedded in this structure is a point-function, a function that will produce zero only for one point in the domain. Obfuscation of point-function has been thoroughly investigated in cryptography research.

The basic idea of point-function obfuscation is to use a random oracle O to produce the output O(k) on input k and to compare it with the stored O(k*). The security is guaranteed by the impossibility of obtaining k* from knowing O(k*). In practice, the random oracle is usually substituted by a cryptographic hash function such as Message Digest algorithm 5 (MD5) or secure has algorithm (SHA). Therefore, it is suggested to deploy a one-way hash function in the present logic encryption scheme.

Figure 7:
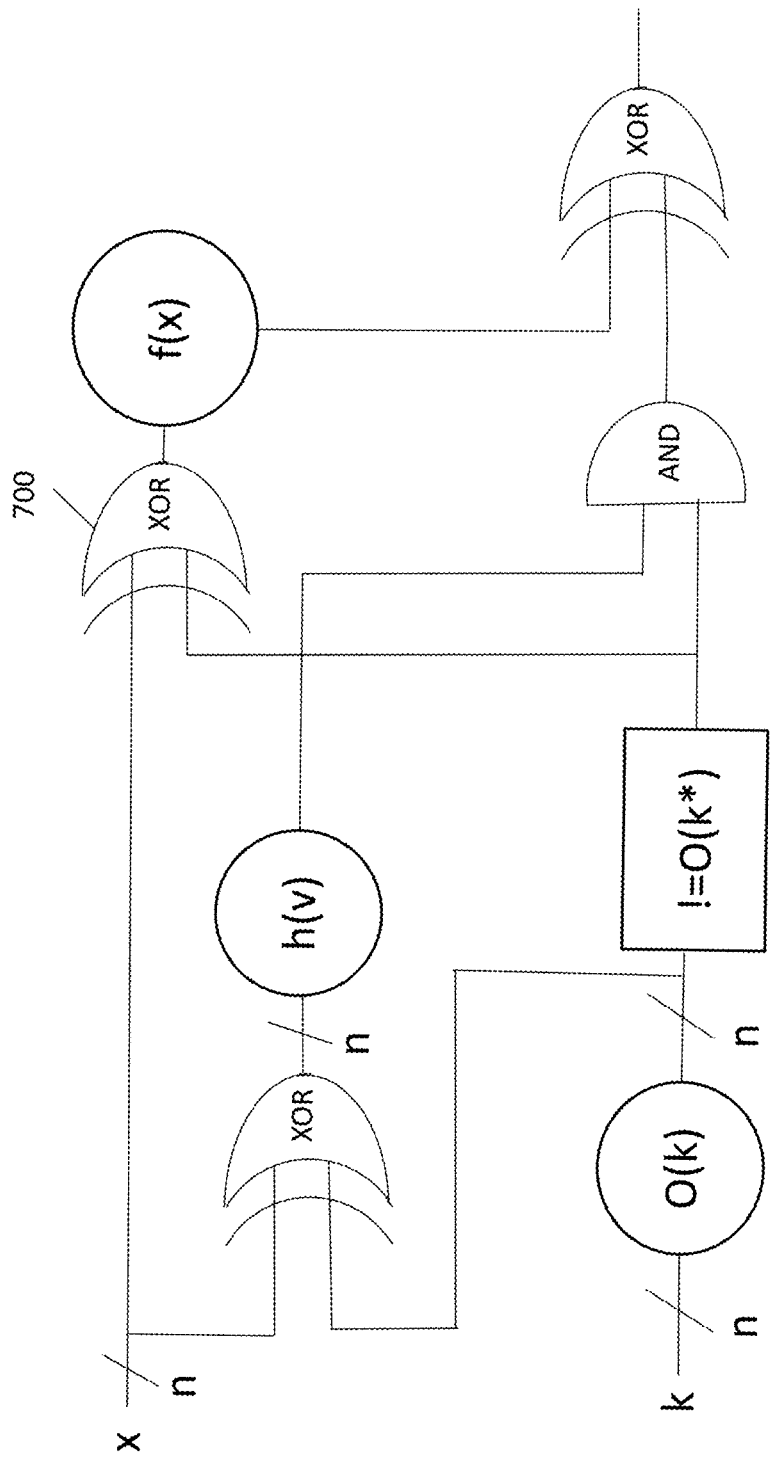
FIG. 7 depicts an obfuscation design for general logic encryption before further resynthesis, in which O(k) is a one-way hash function, h(v) has an on-set of size M, and an XOR gate only applies to a small subset of x bits in accordance with an illustrative embodiment.

Another goal is to mix up the logic f(x) with other part of the encryption, especially with k. Thus, it is proposed to connect the output of the key checking O(k)≠O(k*) to XOR gates with a randomly selected bits of x before they feed into f. FIG. 7 shows an illustrative circuit before further resynthesis operations are applied, where the XOR 700 indicates that only a random subset of bits are modified.

Scientific Benchmarks for Approximate Attacks

One challenge in studying approximate attack methods is the lack of ability to scientifically measure their performance. Different from the exact attacks, where the correctness can be measured by comparing the keys or by comparing the circuits if there are more than one correct keys, the performance of approximate attacks cannot be easily measured by the generated keys or even the generated circuits. For two approximate attacks, one is better than the other if the circuit generated by one has less error rate than that generated by the other. Exact measure of error rate involves circuit simulation for all possible inputs or to do SAT to find all errors one by one, which is not a cost-effective process.

Not any better is the current practice of using the combination of a traditional encryption and a specific encryption against the SAT-based attack such as Anti-SAT. One thing that is straightforward to report is the number of benchmarks where the key to the traditional encryption is correct. However, if an approximate attack cannot get the key to the traditional encryption correct, which is very common for large or complex benchmarks, the process becomes complicated. Measuring how many bits are correct in the key to the traditional encryption is of no use, since a mistake on one bit may have more errors than a mistake on many other bits. Using random sampling for error rate measurement is relatively inexpensive, but its accuracy is uncertain.

For these reasons, developed herein is a set of scientific benchmarks to measure the performance of approximation attacks. The desired properties for the scientific benchmarks include: i) Different keys should have different error rates; ii) The error rate is known for each key; iii) The error rates should be adjustable; and iv) The benchmarks should be difficult for the SAT-based attack.

Figure 8:
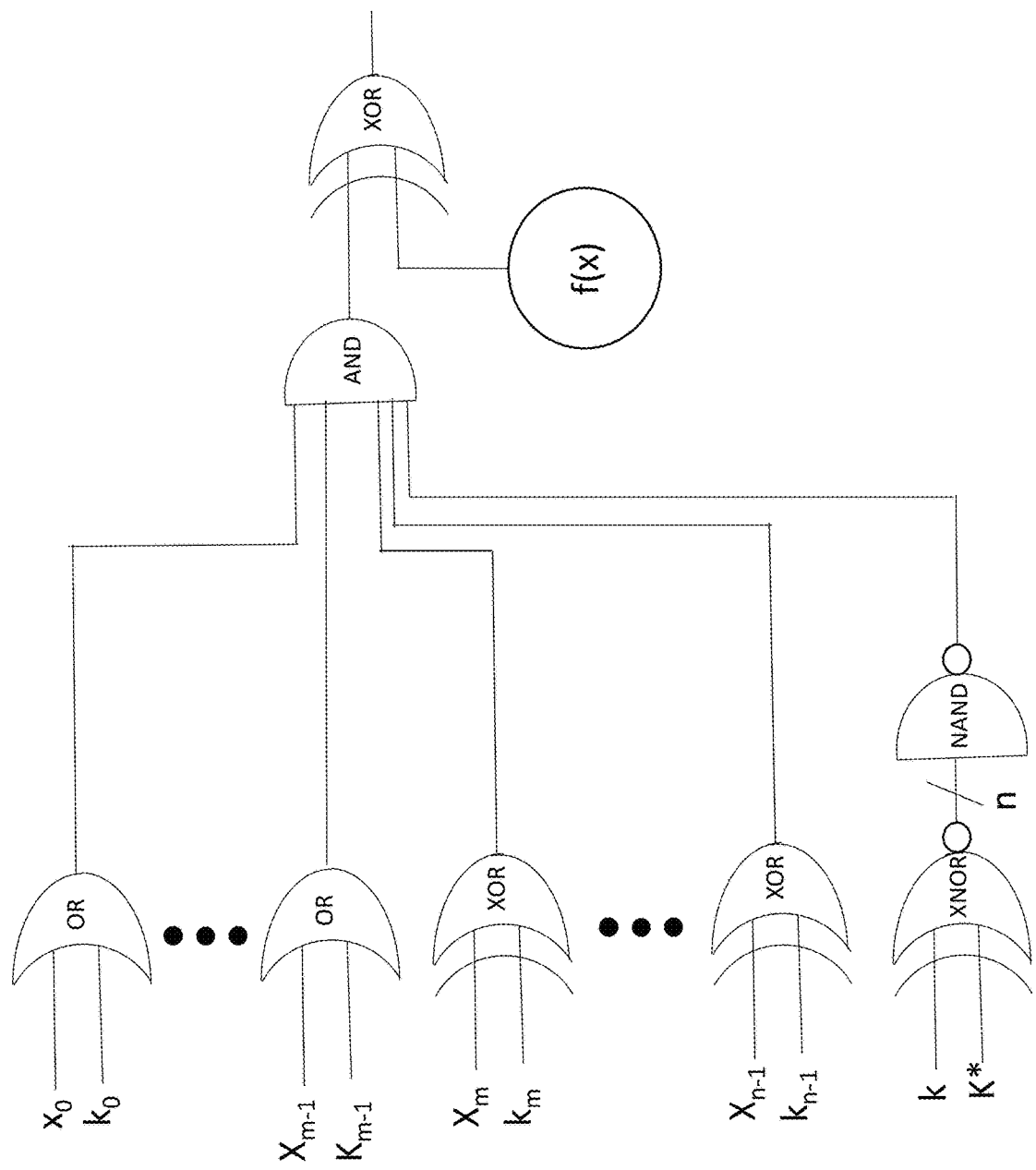
FIG. 8 depicts an encryption logic design for identified scientific benchmarks in accordance with a first illustrative embodiment.

Based on the theories and designs developed herein, a suite of scientific benchmarks has been designed, and the general design is depicted in FIG. 8.

It is assumed that the original circuit f(x) has n input bits and the logic encryption has n key bits. A correct key k*, and a number m<n are selected as design parameters. As shown in FIG. 8, there is an OR of $x_i$ and $k_i$ for all $i \in 0 \ldots m-1$ and an XOR of $x_i$ and $k_i$ for all $i \in m \ldots n-1$. These n outputs are fed to an AND gate. The equivalence of k and k* will generate a zero also to the same and gate. The output of the AND gate is used to flip the output of f(x) by an XOR operation. The design did not consider circuit analysis attacks to these benchmarks, since resynthesis can be performed to hide the circuit structure.

Figure 9:
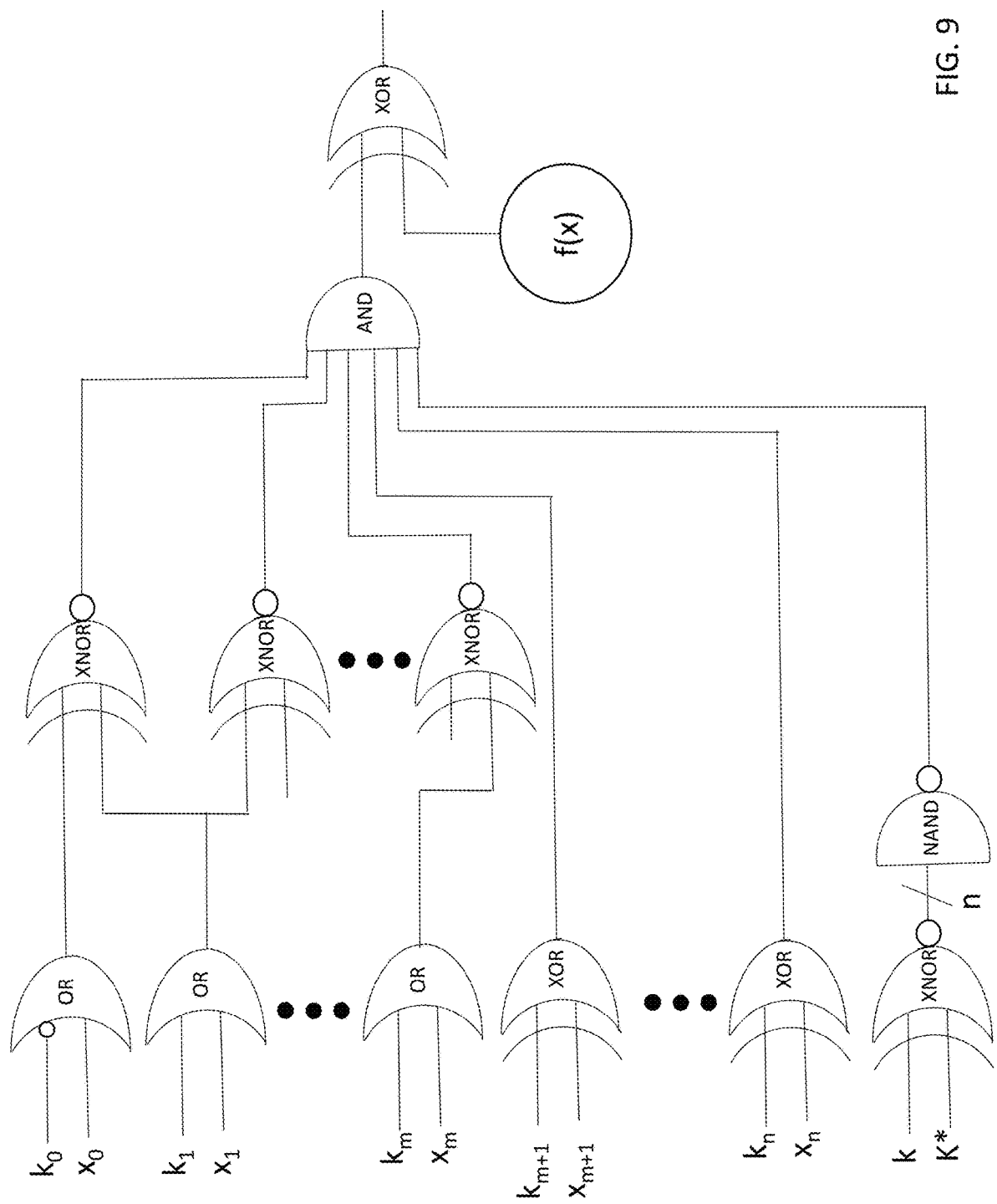
FIG. 9 depicts an encryption logic design with extra XNOR gates for identified scientific benchmarks in accordance with a second illustrative embodiment.

Randomness can also be introduced to the benchmarks by randomly selecting k*, randomly selecting the m indices for the OR gates (the remaining will be XOR gates), and randomly inserting an inverter after each key bit in front of the circuit. A similar but more complex benchmark is given in FIG. 9. The following theorem can be proven for the presented scientific benchmarks. Theorem 3: The scientific benchmarks designed as shown in FIG. 8 will have different error rates ranging from $2^{-n}$ to $2^{m-n}$. The error rate is known for each key, and the minimal number of iterations for the SAT-based attack is $2^{n-m}$.

The upper bound of error rate happens when $k_i$ for every $i \in 0 \ldots m-1$ is set to one, so the value of flip signal depends on the result of XOR gate. For a random assignment of $k_i$ for all $i \in m \ldots n-1$, the flip signal is 1 only if $x_i$ is the opposite of $k_i$ for all $i \in m \ldots n-1$. It follows that the error rate is $2^m/2^n = 2^{m-n}$.

The lower bound of error rate happens when $k_i$ for every $i \in 0 \ldots m-1$ is set to zero, so the flip signal is one only if $x_i = 1$ for $i \in 0 \ldots m-1$ and $x_i = \overline{k_i}$ for $i \in m \ldots n-1$. In that case, the error rate is $2^{-n}$. Any other key values will have error rate ranging from $2^{-n}$ to $2^{m-n}$. To solve the correct key, the SAT-based attack should prune out all wrong keys, so the number of iterations for the SAT-based attack is at least $2^{n-m}$.

Experimental Results

As discussed herein, a logic encryption can be designed for any circuit to fully determine its attack complexity (in terms of the number of queries to the original circuit) and the error rate for wrong keys. Experiments on the SAT-based attack have been conducted to verify the theory, to check the effectiveness of Goldreich's one-way function, and to measure the actual attack time by the SAT-based attack.

It should be noted that in the encryption schemes presented herein, the attack complexity and error rate is independent of the original circuit f(x). This has been verified by checking the attack time of an SAT-based attack on the same encryption on a set of different original circuits. In fact, even using a constant function f(x)=0 provides the same result.

Referring again to the logic encryption design shown in FIG. 4, it is noted that in this encryption, the h(v) function has an on-set of $2^{n/2}$. Thus, it has $2^{n/2}$ as both attack complexity and error number. A sequence of encryptions with the input lengths ranging from 12 to 26 was created. Then the SAT-based attack is run on them and the runtime collected. The result is plotted in FIG. 10, where the x-axis shows the input lengths and y-axis gives the attack time in log scale.

Another goal of testing was to verify the effectiveness of using Goldreich's one-way function in logic encryption. The first step of obfuscation shown in FIG. 7 was implemented on top of the simple logic encryption in the first set of experiments. The O(k) function in the circuit is implemented by Goldreich's one-way function with an input length of 80 and an output length of 40. In alternative embodiments, a different input length may be used such as 70, 90, 100, 150, etc. Simarly, a different output length may also be used such as 30, 50, 60, 100, etc. The formula $P = x_0 \oplus x_1 \oplus x_2 \oplus (x_3/x_4)$ discussed above was used. To minimize the disturbance on the attack complexity, the XOR function 700 is not implemented. The SAT-based attack is run on these encryptions with different input bit-length, and the results are shown in FIG. 10.

Figure 10:
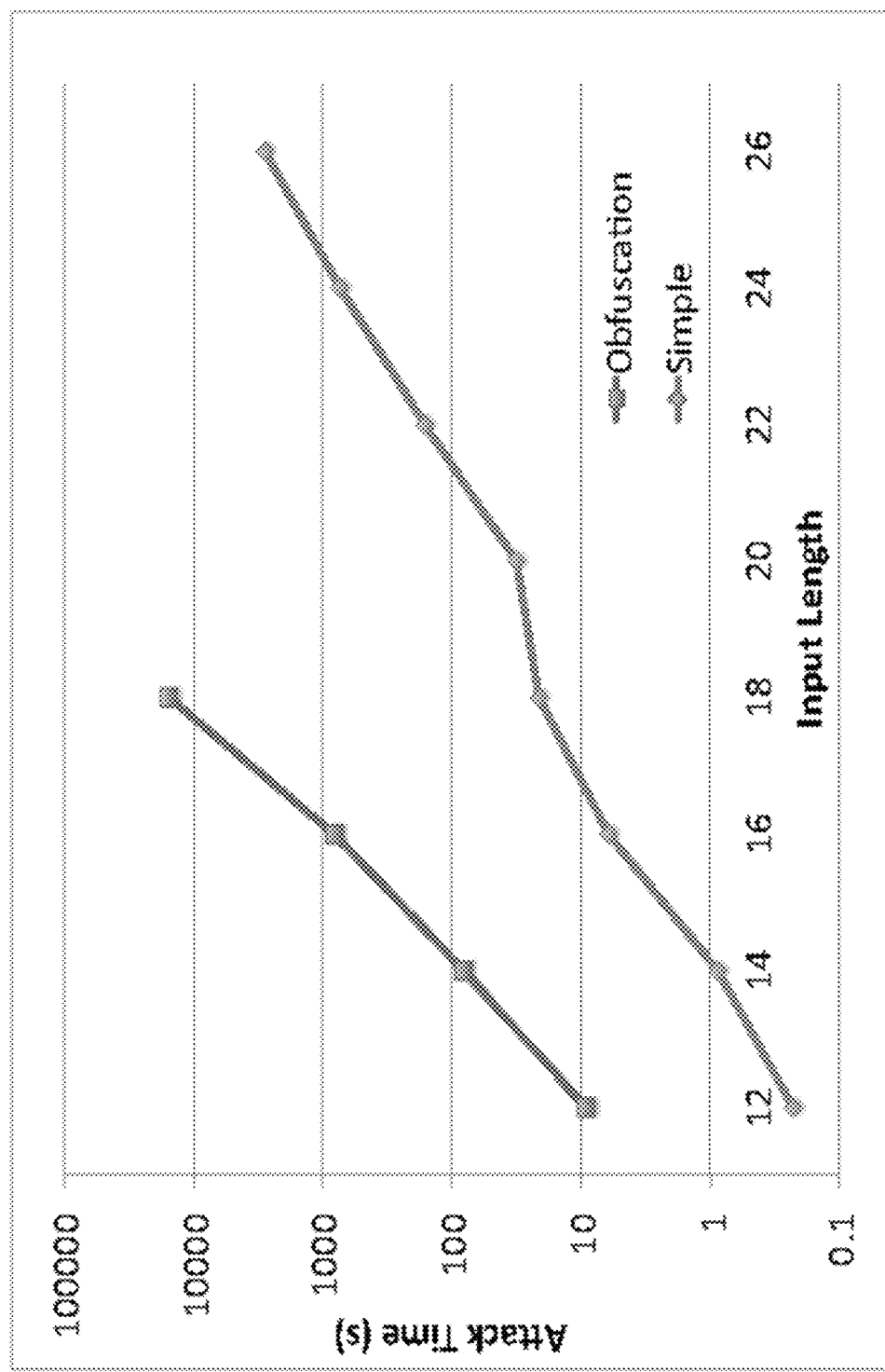
FIG. 10 depicts run-time date for a SAT-based attack on the logic encryption design of FIG. 4 and the obfuscation design of FIG. 7 in accordance with an illustrative embodiment.

As can be verified in FIG. 10, both the simple logic encryption and its obfuscation with Goldreich's one-way function have exponential growths of attack time in terms of the input lengths. With Goldreich's one-way function, the growth of the attack time becomes bigger and steeper, confirming the logic encryption designs presented herein.

Conclusion

Thus, the inventor has developed a theory and implemented an effective design for logic encryption based on the theory. The development started with a seperation of the two entangled goals in logic encryption, that is, a logic requirement of locking and a structural requirement of hiding. Considering only the logic locking portion, a theory that gives a complete view of the logic encryption design space, and its relations with attack complexity and error rate was developed. A contention between attack complexity and error rate was also proven, and general logic encryption circuit of linear size has been derived based on the theory.

Circuit obfuscation is applied on top of the logic encryptions to address the structural requirement of hiding. It has also been shown that resynthesis operations are complete for best-possible obfuscation. Approaches to use one-way functions to protect the sensitive key checking process and to burden an SAT engine in an attack are also described.

The logic encryption designs and the obfuscation with one-way function was tested using the SAT-based attack. The experimental results have confirmed the theory and the robustness of designs presented herein.

It is to be understood that any of the operations/processes described herein may be performed at least in part by a computing system that includes a processor, memory, transceiver, user interface, etc. The described operations/processes can be implemented as computer-readable instructions stored on a computer-readable medium such as the computer system memory. Upon execution by the processor, the computer-readable instructions cause the computing system to perform the operations/processes described herein.

Figure 12:
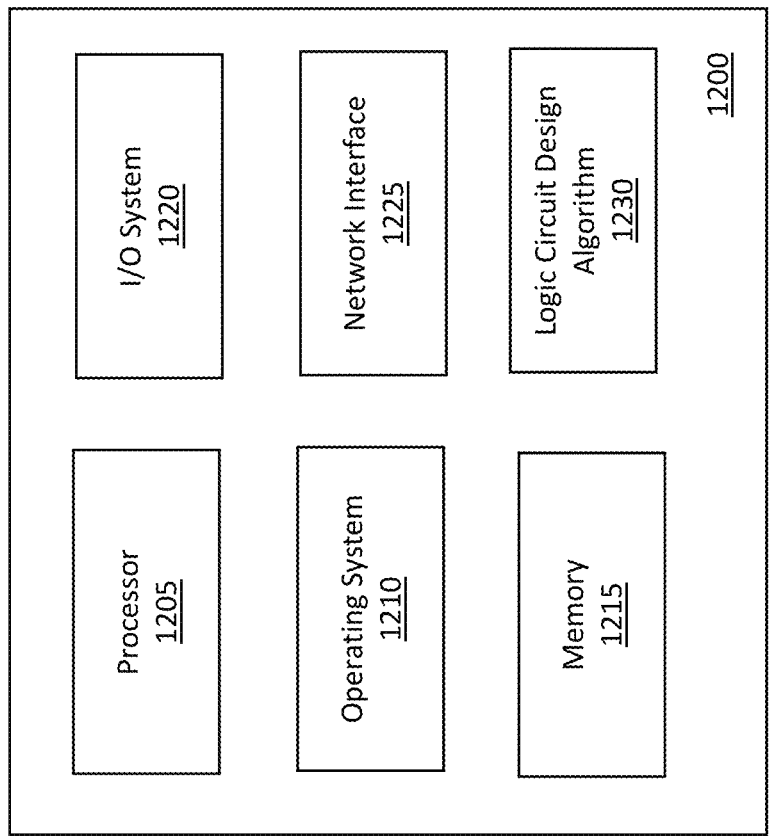
FIG. 12 is a block diagram of a computing system for generating logic circuits in accordance with an illustrative embodiment.

FIG. 12 is a block diagram of a computing system 1200 for generating logic circuits in accordance with an illustrative embodiment. The computing system 1200 includes a processor 1205, an operating system 1210, a memory 1215, an input/output (I/O) system 1220, a network interface 1225, and a logic circuit design algorithm 1230. In alternative embodiments, the computing system 1200 may include fewer, additional, and/or different components. The components of the computing system communicate with one another via one or more buses or any other interconnect system. The computing system 1200 an be incorporated into a device such as a laptop computer, desktop computer, smart phone, tablet, workstation, server, etc.

The processor 1205 can be any type of computer processor known in the art, and can include a plurality of processors and/or a plurality of processing cores. The processor 1205 can include a controller, a microcontroller, an audio processor, a graphics processing unit, a hardware accelerator, a digital signal processor, etc. Additionally, the processor 1205 may be implemented as a complex instruction set computer processor, a reduced instruction set computer processor, an x86 instruction set computer processor, etc. The processor is used to run the operating system 1210, which can be any type of operating system. The processor 1205 uses the design algorithm 1230 to process error rates and attack complexity, and to generate logic circuits as described herein. The processor 1205 and/or logic circuit design algorithm 1230 also provide obfuscation of the generated logic circuit using any of the techniques described herein.

The operating system 1210 is stored in the memory 1215, which is also used to store programs, user data, network and communications data, peripheral component data, and the logic circuit design algorithm 1230. The memory 1215 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1220 is the framework which enables users and peripheral devices to interact with the computing system 1200. The I/O system 1220 can include a mouse, a keyboard, one or more displays, a speaker, a microphone, and/or any other user interfaces that allow the user to interact with and control the computing system 1200. The I/O system 1220 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 1225 includes transceiver circuitry that allow the computing system to transmit and receive data to/from other devices such as remote computing systems, servers, websites, etc. The network interface 1225 enables communication through a network (not shown), which can be one or more communication networks. The network can include a cable network, a fiber network, a cellular network, a wi-fi network, a landline telephone network, a microwave network, a satellite network, etc. The network interface 1225 also includes circuitry to allow device-to-device communication such as Bluetooth® communication.

The logic circuit design algorithm 1230 can include computer-readable instructions stored in the memory 1215 and that, upon execution, design any of the logic circuits described herein. The logic circuit design algorithm 1230 can be programmed and compiled using any techniques known in the art. The processor 1205 uses the logic circuit design algorithm 1230 to process logic circuit design goals and to generate a logic circuit that satisfies the design goals while eliminating attack vulnerabilities as described herein. In an alternative embodiment, the logic circuit design algorithm 1230 can be remote or independent from the rest of the computing system 1200, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for encrypting logic, the method comprising:
  generating, by a computing system, locking logic for inclusion in a logic circuit, wherein the locking logic is generated based at least in part on an error rate and an attack complexity, wherein the error rate comprises a percentage of inputs that will generate a wrong output;
  inserting, by the computing system, a one-way function into the locking logic; and
  applying, by the computing system, obfuscation logic to the logic circuit, wherein the obfuscation logic is applied on top of the locking logic.

2. The method of claim 1, wherein the obfuscation logic comprises indistinguishability obfuscation logic.

3. The method of claim 2, wherein the indistinguishability obfuscation logic makes the logic circuit computationally indistinguishable from an obfuscation of any other equivalent circuit.

4. The method of claim 1, wherein applying obfuscation logic comprises applying a sequence of resynthesis to the logic circuit.

5. The method of claim 1, wherein applying obfuscation logic comprises applying point-function obfuscation to the logic circuit.

6. The method of claim 5, wherein applying point-function obfuscation to the logic circuit includes using a random oracle to produce an output.

7. The method of claim 5, wherein applying the point-function obfuscation comprises using a one-way cryptographic hash function.

8. The method of claim 1, further comprising generating an error matrix, wherein the locking logic is generated based at least in part on the error matrix.

9. The method of claim 1, wherein the one-way function comprises a Goldreich's one-way function.

10. The method of claim 9, wherein the Goldreich's one-way function has an input length of 80 and an output length of 40.

11. A system to encrypt logic, the system comprising:
a memory; and
a processor operatively coupled to the memory, wherein the processor is configured to:
generate locking logic for inclusion in a logic circuit, wherein the locking logic is generated based at least in part on an error rate, and wherein the error rate comprises a percentage of inputs that will generate a wrong output;
insert a one-way function into the locking logic; and
apply obfuscation logic to the logic circuit, wherein the obfuscation logic is applied independent from the locking logic.

12. The system of claim 11, wherein the processor is configured to apply obfuscation via application of a sequence of resynthesis to the logic circuit.

13. The system of claim 11, wherein the locking logic is generated based at least in part on attack complexity.

14. The system of claim 11, wherein the processor is configured to apply the obfuscation logic via application of a one-way cryptographic hash function.

15. The system of claim 11, wherein the obfuscation logic comprises indistinguishability obfuscation logic.

16. The system of claim 15, wherein the indistinguishability obfuscation logic makes the logic circuit computationally indistinguishable from an obfuscation of any other equivalent circuit.

17. The system of claim 11, wherein the processor is further configured to generate an error matrix, wherein the locking logic is generated based at least in part on the error matrix.

18. The system of claim 11, wherein the one-way function comprises a Goldreich's one-way function.

* * * * *